Nov. 10, 1936.　　　　G. W. ALLEN　　　　2,060,651
BEARING
Filed April 11, 1936
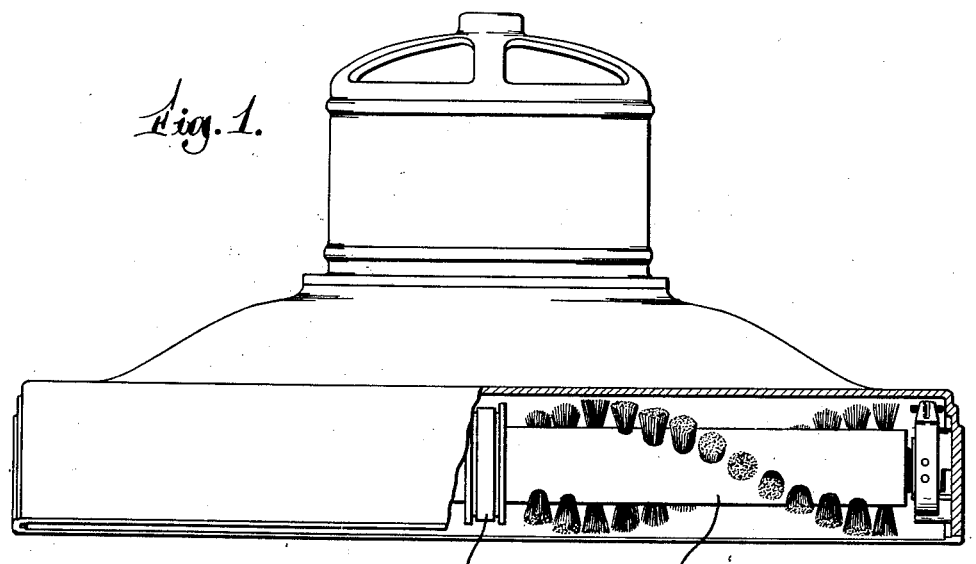
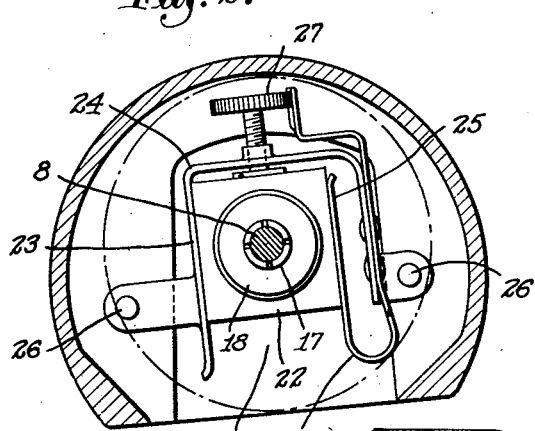
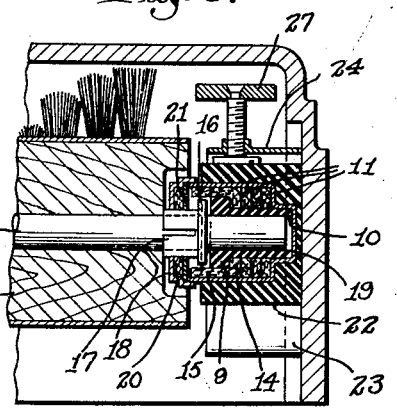
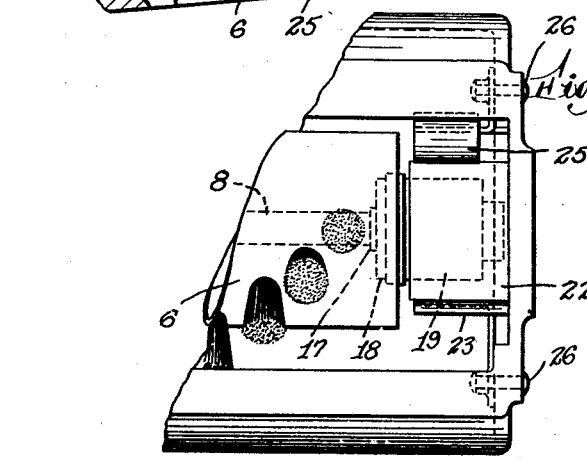
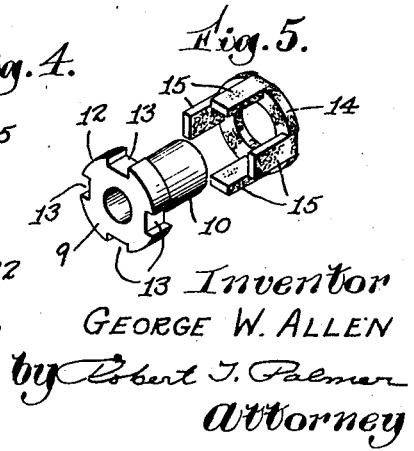
Inventor
GEORGE W. ALLEN
by Robert J. Palmer
Attorney Patented Nov. 10, 1936

2,060,651

UNITED STATES PATENT OFFICE 2,060,651

BEARING

George W. Allen, Hyde Park, Boston, Mass., assignor to B. F. Sturtevant Company, Boston, Mass.

Application April 11, 1936, Serial No. 73,906

3 Claims. (Cl. 308—36.4)

This invention relates to bearings and relates more particularly to bearings of the type which include oil circulatory systems.

The bearings, according to this invention, were developed for supporting the rotary shafts of power-driven brushes for vacuum sweepers, but, of course, are capable of being used for other purposes.

It is desirable for power-driven brushes for vacuum sweepers, to provide dust-proof bearings which will not leak oil and which may be provided with stored lubricant sufficient for a considerable time.

It has previously been proposed to provide bearing metals porous to oil for the shafts of vacuum sweeper brushes; to place several felt oil storage washers around the bearing metals; to saturate the washers with oil, and to enclose the entire assembly in a dust proof casing, but such arrangements have not heretofore been successful due to the tendency of the oil to leak from the bearings by creeping along the shafts.

According to this invention, means is provided for stopping the oil which has crept along the shaft of the arrangement described in the preceding paragraph, and for recirculating this oil back to the storage reservoir including the aforementioned felt washers.

An object of this invention is to provide a long life, non-leaking bearing for rotary shafts.

Another object of the invention is to provide in a sealed bearing, an oil circulatory system.

Another object of the invention is to return to a bearing, the oil that has leaked therefrom along the rotary shaft for which the bearing is provided.

Other objects of the invention will be apparent from the following description taken together with the drawing.

The invention will now be described with reference to the drawing, of which:

Fig. 1 is a front view with a portion in section of a vacuum sweeper having a power driven brush with which the bearings according to this invention, are used;

Fig. 2 is an enlarged end view with end removed, of the brush suspension of Fig. 1;

Fig. 3 is an enlarged sectional view through one end of the brush and one bearing of the arrangement of Figs. 1 and 2;

Fig. 4 is an enlarged plan view looking at one end of the brush arrangement of Fig. 1, from underneath; and Fig. 5 is a projected view of the oil porous bearing utilized, and of the felt member with extensions utilized in one embodiment of the invention to fit over the bearing to recirculate the oil leaking from the bearing.

The brush 6 is adapted to be rotated by the blower motor of the sweeper by means of a belt around the pulley 7. The shaft 8 of the brush is supported at both ends by similar bearings, the details of one of which are shown by Figs. 3 and 5.

The bearing assembly is made up of the bearing 9 which may be of a bronze composition which is porous to oil but sufficiently hard to provide a good wearing surface in contact with the shaft 8. Over the cylindrical portion 10 of the bearing are fitted the three felt washers 11 which are saturated with oil to provide lubrication for a long period of time for the bearing. The bearing has a flange portion 12 with the four grooves 13. Around the cylinder 10 is also placed a felt member which has the portion 14 similar to the washers 11 but which is provided with the four tongue like extensions 15 which extend through the grooves 13, inwardly as shown by Fig. 3 to a point inside of the flange 16 on the thrust bushing 17 of the shaft 8.

Closely fitted around the inner portion of the bushing 17 is the end cap 18 of the bearing housing 19. This end cap has two interior stepped portions within the smaller of which is placed the oil retaining felt washer 20 and within the larger of which is placed the metal washer 21 which fits against the inner edge of the housing 19.

The extensions 15 of the member 14 extend through the grooves 13 into the spaces between the inner end of the bearing portion 9 and the flange 16, and between the flange 16 and the metal washer 21. If these extensions or tongues 15 were not so provided and placed, the oil from the felt washers around the sleeve portion 10 of the bearing, would during the rotation of the shaft 8, pass through the bearing and creep along the shaft until practically all of it had been drained from the reservoir including the felt washers. Some of the oil thus leaking from the bearing would eventually pass the washers 20 and 21, and the cap 18 and be absorbed by the wooden frame within the sweeper cylinder 6.

The tongues 15 are seen to be in position to receive the oil thrown off by the flange 16 during rotation thereof, and to return it to the felt washers comprising an oil reservoir, around the oil sleeve 10 of the bearing. Thus an oil circulating system is provided which results in a bearing arrangement which need not be replenished with lubricant over long periods of time.

The bearing housing 19 is fitted with the rubber member 22 which provides a resilient mounting for the bearing, and which is held between the straight leg 23, and the turned in clip-like leg 25 forming a yielding support, of the bracket 24. The bracket 24 is mounted at 26 to the end wall of the sweeper. The screw 27 is adjustable in the bracket 24 to provide at its lower end, an adjustable stop for properly positioning the rubber member 22.

As may be clearly seen from Figs. 2 and 4, the brush cylinder 6 may be easily inserted within the nozzle of the sweeper by forcing the rubber members 22 at each end against the pressure of the spring member 25, within the bracket 24.

Whereas one embodiment of the invention has been described for the purpose of illustration, it should be understood that the invention is not limited to the exact arrangement described, since many departures will suggest themselves to those skilled in the art after having had access to this disclosure.

What is claimed is:

1. A bearing assembly comprising in combination, a rotary shaft, an oil porous bearing around the outer portion of said shaft, an oil reservoir, a plurality of oil absorbing rings in said reservoir and in contact with said bearing for supplying oil to the surface of said bearing, and an oil absorbing ring around said shaft at the inner portion of said bearing, said ring having a plurality of tongue like extensions extending over said shaft beyond said bearing for receiving the oil thrown out of said bearing by said shaft and for returning it to said absorbing material in said reservoir.

2. A bearing assembly comprising in combination, a rotary shaft, an oil porous bearing member having a flange at its inner end around the outer portion of said shaft, an oil reservoir containing oil absorbing material in contact with said member, for supplying oil to the surface of said member, a flange on said shaft adjacent said flange on said member, and an oil absorbing ring in said reservoir having a plurality of arms extending around said flanges for receiving the oil thrown off by said last mentioned flange and for returning it to said absorbing material in said reservoir.

3. A bearing assembly comprising in combination, a rotary shaft, an oil porous bearing member having a flange having a plurality of grooves at its inner end around the outer portion of said shaft, an oil reservoir containing oil absorbing material for supplying oil to the surface of said member, a flange on said shaft adjacent said flange on said member, and oil absorbing means extending through said grooves, around said flange on said shaft and into said reservoir for receiving the oil thrown off by said flange and for returning it to said absorbing material in said reservoir.

GEORGE W. ALLEN.